(12) United States Patent
Birch et al.

(10) Patent No.: US 8,824,481 B2
(45) Date of Patent: Sep. 2, 2014

(54) SYSTEM, METHOD, AND APPARATUS TO CORRELATE A TCAP WEB SERVICE REQUEST TO AN APPLICATION SERVER SESSION

(75) Inventors: Oliver Birch, Annapolis, MD (US); Can P. Boyacigiller, Annapolis, MD (US); Sreeni Pamidala, Crofton, MD (US); Bouna Sall, Bowie, MD (US)

(73) Assignee: International Business Machines Corporation, Armonk, NY (US)

( * ) Notice: Subject to any disclaimer, the term of this patent is extended or adjusted under 35 U.S.C. 154(b) by 1702 days.

(21) Appl. No.: 12/259,690

(22) Filed: Oct. 28, 2008

(65) Prior Publication Data

US 2010/0103925 A1 Apr. 29, 2010
US 2012/0294301 A2 Nov. 22, 2012

(51) Int. Cl.
*H04L 12/26* (2006.01)

(52) U.S. Cl.
USPC .............. 370/395.21; 370/385; 370/395.64; 370/395.3; 370/494; 370/496; 455/220; 455/222; 455/227

(58) Field of Classification Search
USPC ............... 370/300, 385, 377, 395.64, 395.21, 370/395.3, 493, 494, 495, 496; 709/204–207, 220–222, 227–229, 203, 709/231–232
See application file for complete search history.

(56) References Cited

U.S. PATENT DOCUMENTS

| | | | |
|---|---|---|---|
| 7,296,076 B1* | 11/2007 | Portolani | 709/227 |
| 2003/0233486 A1* | 12/2003 | Creamer et al. | 709/318 |
| 2004/0062375 A1* | 4/2004 | Wang et al. | 379/219 |
| 2004/0193699 A1* | 9/2004 | Heymann et al. | 709/218 |
| 2005/0190750 A1* | 9/2005 | Kafka et al. | 370/352 |
| 2006/0034258 A1* | 2/2006 | Bouckaert et al. | 370/352 |
| 2007/0201665 A1* | 8/2007 | Kocan et al. | 379/201.02 |
| 2007/0203835 A1* | 8/2007 | Cai | 705/43 |
| 2008/0020756 A1* | 1/2008 | Jiang | 455/432.1 |

* cited by examiner

*Primary Examiner* — Kibrom T Hailu
*Assistant Examiner* — Zewdu A Beyen
(74) *Attorney, Agent, or Firm* — Jeffrey T. Holman (57) ABSTRACT

A method includes encoding a session identifier into a uniform resource identifier (URI) associated with a TCAP Begin message request originating at an application server, where the session identifier identifies a communication session. The method also includes transmitting the TCAP Begin message request from the application server to a transaction capabilities application part (TCAP) interface and receiving a TCAP Continue message request from the TCAP interface with the TCAP Continue message request including the encoded URI. The method includes correlating the TCAP Continue message request to the communication session that originated the Begin request identified by the session identifier in the received URI and routing the TCAP Continue message request to the communication session.

20 Claims, 5 Drawing Sheets

PRIOR ART

SYSTEM, METHOD, AND APPARATUS TO CORRELATE A TCAP WEB SERVICE REQUEST TO AN APPLICATION SERVER SESSION

BACKGROUND

In today's converged telecommunications environment, a telephone call may originate in a modern IP network and terminate in or pass through a circuit-based switched network. A network such as a Public Switched Telephone Network (PSTN) using a Signaling System 7 (SS7) protocol may be used to implement traditional switch based communications networks for setting up and tearing down calls. Session Initiation Protocol (SIP) is a signaling protocol for the more modern IP based IMS networks as opposed to the substantial legacy base of the traditional circuit-switch based SS7 networks. SIP defines call-setup and signaling. These features permit the familiar telephone-like operations of dialing a number, causing a phone to ring, and hearing ring back tones or a busy signal.

A Transaction Capabilities Application Part (TCAP) gateway may provide on one end an interface in a service-provider's legacy PSTN network managed through the SS7 signaling protocol and on the other end an interface to other external non TCAP systems. A service using an asynchronous communication interface from a standards based Java Specification Request (JSR) 116 SIP Servlet specification application server to a PSTN over a SS7 protocol for instance, must initiate a communication session over the TCAP server. Additionally, an application server may manage Servlets for multiple communication sessions so as to enable multiple users to place calls on the PSTN concurrently.

Often, both modern network elements and legacy communication systems must communicate in a service provider's network. These hybrid systems are also called upon for new applications, such as converged SIP and HTTP applications, other than those for which they were designed. When legacy systems are used to operate with these new applications, the interface between the legacy system and the more modern system may fail.

When connecting an application such as the open standard JSR116 application with a TCAP interface using asynchronous web services, the TCAP interface may respond immediately to each web service request from the application server with an acknowledgment that the request was received. This allows call processing to continue without waiting for the actual web services response which the TCAP interface sends later in a new web service request that it initiates to the application server.

However, one problem encountered above is that application servers cannot correlate the asynchronous web service request from the TCAP interface to a particular SIP call or Java Specification Request (JSR) 116 application session that initiates the dialogue. The JSR 116 application sends the original request to the TCAP interface but the application server does not have a means of correlating the asynchronous web service request from the TCAP interface to the application session that initiated the original request.

Implementing the application server on a business process engine like the WebSphere™ Process Server (WPS) fails to bridge the legacy SS7 network to the SIP as WPS does not have support for SIP. Also a synchronous design of the web services cannot be deployed in a service provider's network as applications must process incoming asynchronous SIP messages without being blocked on by a web service call.

SUMMARY

Embodiments of a computer program product for correlating a TCAP web service request to an application server session are described. In one embodiment, the computer program product, when executed on a computer causes the computer to perform operations to encode a session identifier of an application session into a Uniform Resource Identifier (URI) associated with a TCAP Begin message request originating at an application server. The session identifier identifies a communication session or SIP call. The application server transmits the TCAP Begin message request to a TCAP interface and receives a TCAP Continue message request from the TCAP interface in return. The TCAP Continue message request also includes the encoded URI. In one embodiment, the TCAP Continue message request is correlated to the communication session that originated the request, identified by the application session identifier in the embedded encoded URI.

Embodiments of a web service system are also described. In one embodiment, the system includes an encoder which encodes a session identifier into a URI associated with a TCAP Begin message request. This URI is then included in the TCAP Begin message request at an application server. The session identifier identifies a communication session. A transmitter transmits the TCAP Begin message request from the application server to a TCAP interface. A receiver receives a TCAP Continue message request at the application server sent from the TCAP interface in response to the TCAP Begin web service request. The TCAP Continue request also contains the encoded URI. A decoder decodes the session identifier from the encoded URI. A session manager correlates the TCAP Continue message request with the application session identified by the session identifier in the URI and routes the TCAP Continue message request to the communication session.

Other embodiments such as a method of use of a legacy phone system via an application server are described. In such an embodiment of use, the method includes responding to request for a communication session between a TCAP interface connected to a SS7 legacy phone system and an application server connected to a Voice Over Internet Protocol (VOIP) interface. The correlation is achieved by defining a session identifier that the application Server uses to route incoming messages to the original session. The session identifier identifies a communication session.

The method of use includes defining a session identifier. The application server then transmits the TCAP Begin message request to the TCAP interface, where it is returned to the application server in a TCAP Continue message request containing the session identifier. The application server then correlates the TCAP Continue message request from the TCAP interface to the communication session using the session identifier contained within the TCAP Continue message.

Other embodiments of a method to correlate a TCAP web service request to an application server session are also described. Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

An application server may manage and interface applications between client computers and devices in a communication session. A web service application may have a collection of endpoints indicating a specific location and interface through a specific message protocol and data format. Additionally, as the basic unit of communication between a web service and a client, a message may be communicated to or from a web service as a single logical transmission. Therefore, a communication session may be made up of many messages between an application server and a client computer or device. A means for identifying and keeping web service communication sessions discrete allows multiple communication sessions and respective messages to be concurrent on the same application server.

Figure 1:
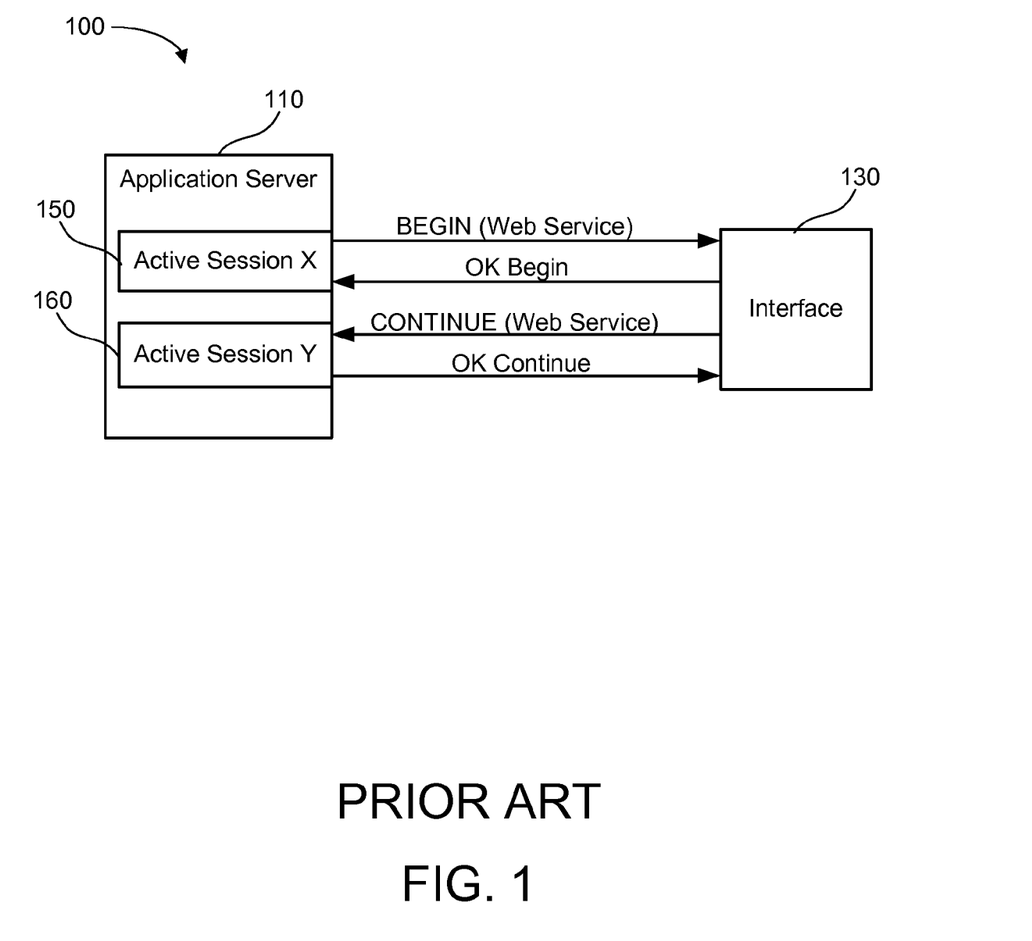
FIG. 1 depicts a prior art web service block diagram.

FIG. 1 depicts a web service block diagram 100 illustrating the failure of existing systems to correlate a TCAP Continue request to a proper session. An application server 110 such as an open standard application server is connected to a peer Application that supports Web services. The TCAP interface 130 is connected to a SS7 legacy phone system. The application server 110 initiates session X 150 in response to a SIP request by sending a TCAP Begin web service message request to the TCAP interface 130. The TCAP interface 130 communicates with a TCAP server (not shown) on the TCAP interface 130 and replies to each web service request from the application server 110 with an acknowledgement that the request was received.

The TCAP interface 130 responds to the TCAP Begin message request with a TCAP Continue web service message request sent to the application server 110. The application server 110 in an asynchronous communication session may also reply to each message request coming from the TCAP interface 130 with an acknowledgement that the request was received. However, the application server 110 may fail to correlate the TCAP Continue message request to the application session X 150 that initiated the original TCAP Begin request, and therefore fail to get back to the call session that originated the request. The application server 110 cannot correlate the asynchronous request from the TCAP interface 130 to session X 150. This causes the original SIP call to fail to receive the correct service it needed from the SS7 network.

Therefore, the application server 110 instantiates a new session Y 160 and forwards the TCAP Continue message request to session Y 160. Opening session Y 160 fails the call as session Y 160 does not have the context to process the TCAP Continue message request. Session Y 160 does not have a SIP call associated with it.

Figure 2:
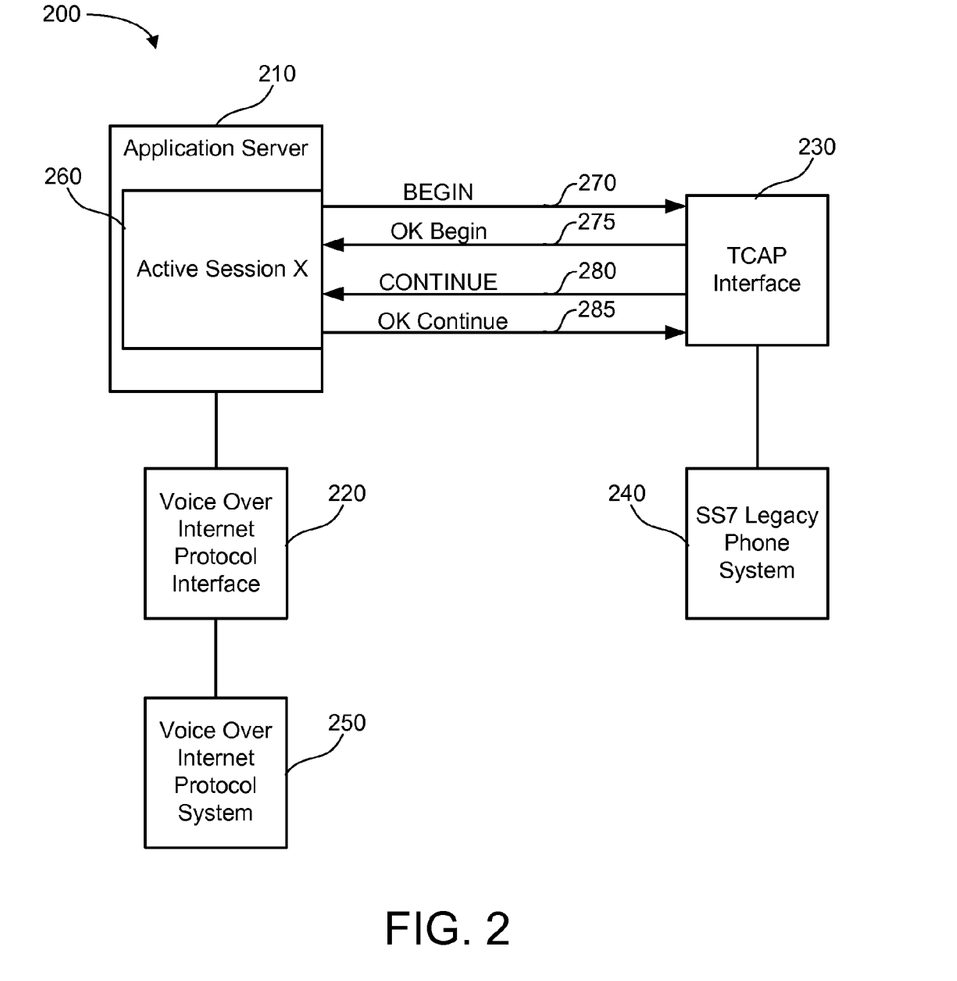
FIG. 2 depicts a block diagram of one embodiment of a system for web service.

FIG. 2 depicts a block diagram of one embodiment of a system 200 for a web service. The system includes an application server 210, a VOIP interface 220, a TCAP interface 230, an SS7 Legacy Phone System 240, and a VOIP system 250. The system 200 manages one or more sessions connecting a VOIP communication to a legacy communication protocol. The system correlates a TCAP web service request to an application server session.

The application server 210, in one embodiment, manages one or more active application sessions. The application server 210 may operate a business process engine to implement the web service. In one example, the open standard JSR 116 application server may be operated on the application server 210.

In certain embodiments, the application server 210 transmits a TCAP Begin message request 270 to the TCAP interface 230 which is connected to the SS7 legacy phone system 240. In one embodiment, the application server 210 encodes a session identifier into a URI of the TCAP application. The encoded URI is then included in the TCAP Begin message request 270. The URI, in some embodiments, includes a session identifier that identifies a unique and active session.

A URI is a compact string of characters that may be used to identify or name a resource on the Internet. A URI may be classified as a locator (URL), a name (URN), or both. The URL, as representing a resource that is the target of a hyperlink, may provide a method of finding the URN. A unique session identifier may be encoded into a URI.

An encoded URI, for example, may include the following: "http://annapolis.ibm.com:9080/exemplar/TcapDemoHttp; ibmappid=local.120541 3740441_97". A segment of the encoded URI may include a session identifier. For example, the 'local.12054137440441_97' segment of the URI in the previous example may be a unique session identifier. The encoded URI including the session identifier allows the application server to associate the request that includes the encoded URI with the proper session.

The TCAP interface 230 relays a reply from the SS7 network 240 to a web service request from the application server 210. The reply may constitute an acknowledgement 275 that the request was received. This acknowledgment 275 allows call processing to continue without waiting for the actual response which the TCAP Interface 230 sends later in a new web service request that it initiates.

In an alternate embodiment, the TCAP interface 230 is not configured to relay an acknowledgement 275 in response to the Begin message request 270. The active session 260, in this embodiment, remains idle until a continue message 280 is received and correlated to the active session 260.

The application server 210, in one embodiment, receives a TCAP Continue message request 280 from the TCAP interface 230, with the TCAP Continue message request 280 including the encoded URI. The application server 210 in a communication session may also reply to a message request coming from the TCAP interface 230 with an acknowledgement 285 that the request was received. In certain embodiments, the application server 210 is able to correlate the TCAP Continue message request to the active session X 260 identified by the session identifier encoded in the received URI.

The VOIP interface 220, in one embodiment, connects the application server 110 to a VOIP system 250. The VOIP interface 220 may use any type of known interface. For example, the VOIP interface 220 may be an Ethernet connection.

In some embodiments, the VOIP interface 220 is a component of the application server 210. For example, the VOIP interface 220 may be a physical or logical component of the application server 210, such as an Ethernet port on the application server 210.

In an alternate embodiment, the VOIP interface 220 is separate from the application server 210. For example, the VOIP interface 210 may be implemented on a separate computer (not shown) which is attached to the application server 210.

The SS7 legacy phone system 240, in one embodiment, is connected to the TCAP interface 230. The connection with the SS7 legacy phone system 240 allows the system to communicate with a user operating a device using the SS7 legacy phone system 240. For example, a user on a VOIP device and VOIP system 250 such as a Vonage™ VOIP phone may interface with a legacy phone system such as a SS7 legacy phone system 240.

In one embodiment, the application server 210 is configured to allow a user to interrupt a session 260 call to receive an input entered by the user. For example, the application server 210 may leave a session 260 idle while waiting for the user to input a personal identification number (PIN) verification. In this example, upon receiving the PIN, the application server 210 correlates the messages that contain the PIN to the same session 260 without any disruption in the call.

Since the application server 210 can directly read a session identifier from the encoded URI, the application server 210 does not need to initiate an additional session Y 160 as in FIG. 1. Embodiments may be employed in a service provider's network as applications are able to process incoming SIP messages without being blocked on a web service call. Embodiments of the system 200 above may also assign the received URI as an address of a web service endpoint. The application server 210 may also decode the session identifier from the received URI. Although the system for a web service 200 is shown and described in FIG. 2 with certain components and functionality, other embodiments of the system may include fewer or more components to implement less or more functionality.

Figure 3:
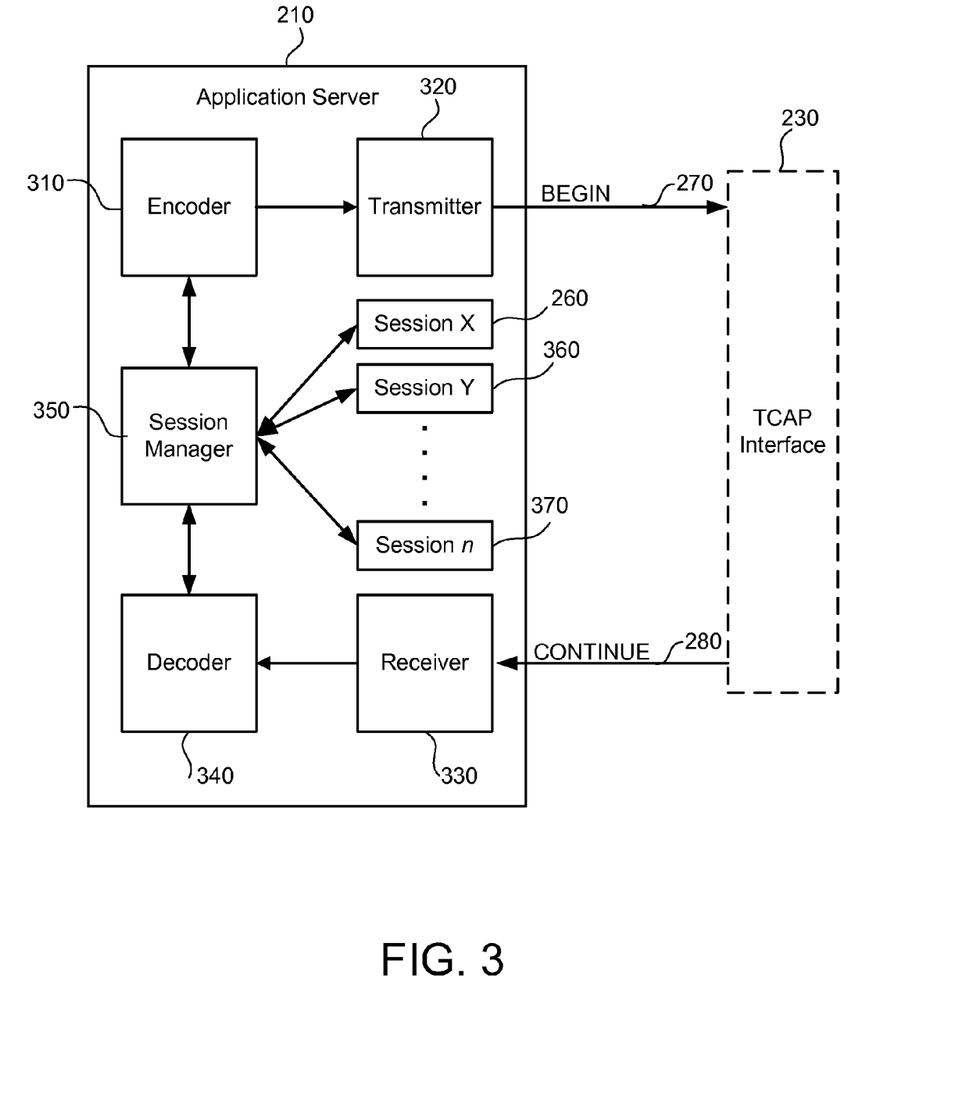
FIG. 3 depicts a block diagram of one embodiment of the application server of FIG. 2.

FIG. 3 depicts a block diagram of one embodiment of the application server 210 of FIG. 2. The application server 210 includes an encoder 310, a transmitter 320, a receiver 330, a decoder 340 and a session manager 350. The application server 210, in one embodiment, manages one or more active server sessions.

The encoder 310, in one embodiment, encodes a session identifier into a URI to be included in a TCAP Begin message request 270 at the application server 210. The session identifier enables the application server 210 to correlate a TCAP web service request to an application server session. The session identifier encoded into the URI may be a static identifier which uniquely identifies an active communication session.

In another embodiment, the session identifier is a code that associates the URI with a particular session. The code may be different between requests associated with the same session. For example, the session identifier may be a revolving code that is generated for each encoded URI. A revolving code may dynamically change for security reasons but still uniquely identify an active communication session. The decoder 340 as discussed below is able to decode the revolving code from the encoded URI.

In certain embodiments, the encoder 310 passes the encoded URI to a session, which, in turn, generates a web service request. The generated web service request includes the encoded URI. The generated web service request is then passed to the transmitter 320 for transmission.

For example, session X 260 may initiate a Begin message request 270. Session X may pass a session identifier to the encoder 310. The encoder 310 may generate an encoded URI that includes the session identifier and return the encoded URI to the session 260. The session 260 may generate the Begin message request including the encoded URI and pass the request to the transmitter 320.

In an alternate embodiment, the session manager 350 may manage session identifiers for active sessions 260, 360, 370. In this embodiment, a session may initiate a web service request by querying the session manager 350 for an encoded URI. The session manager 350 passes a session identifier to the encoder 310 which generates an encoded URI using the session identifier. The encoded URI may be returned to the session manager 350 for delivery to the session. In another embodiment, the encoder 310 may deliver the encoded URI directly to the session.

The transmitter 320, in one embodiment, transmits the TCAP Begin message request 270 from the application server 210 to the TCAP interface 230. The transmitter 320 may also send an acknowledgement signal 275 to the TCAP interface 230. The transmitter 320 may include a logical and a physical layer (not shown). The logical layer of the transmitter 320 may process data from the encoder 310 so that the physical layer of the transmitter 320 may communicate with the TCAP interface 130 through a specific protocol. The physical layer may accommodate protocol specific and hardware specific variations. In certain embodiments, communication requests go to the logical layer of the transmitter 320 first. In turn, the logical layer calls upon the physical layer of the transmitter 320 to implement a protocol the TCAP interface 230 may understand.

The receiver 330 receives a TCAP Continue message request 280 at the application server 210 from the TCAP interface 230 in one embodiment. Inversely to the transmitter 320, when the receiver 330 needs to respond to a communication request, it uses the physical layer to communicate through the logical layer. In certain embodiments, it is the logical layer of the receiver 330 which communicates with the decoder 340 but the physical layer of the receiver 330 may also communicate directly with the decoder 340. The receiver 330 also receives an acknowledgement signal 275 from the TCAP interface 230.

The decoder 340, in one embodiment, decodes the session identifier from the received URI. In some embodiments, the decoder is also able to decode a revolving code based upon predetermined formula shared by the encoder 310 to determine the session associated with the session identifier. The decoder 340 may also include a logical and a physical layer (not shown) in communicating with the receiver 330 and the session manager 350.

The session manager 350, in one embodiment, correlates the TCAP Continue message request 280 to the session identified by the session identifier. The session identifier may be provided by the decoder 340 as discussed above. The session manager 350 also provides an encoding input to the encoder 310 in certain embodiments.

The session manager 350 may manage multiple active sessions X, Y, and Z as depicted by 260, 360, and 370 respectively. The session manager may route incoming messages from the decoder to the particular session as identified by the session identifier. The encoder 310 encodes the session identifier into the URI. The encoded URI, in certain embodiments, is transmitted with the TCAP Begin message request 270 by the transmitter 320.

In some embodiments, the encoded URI returns to the application server 210 as the destination address of a TCAP Continue message 280. The decoder 340 decodes the session identifier from the receiver 330 so the session manager 350 can connect the request to the proper session.

Figure 4:
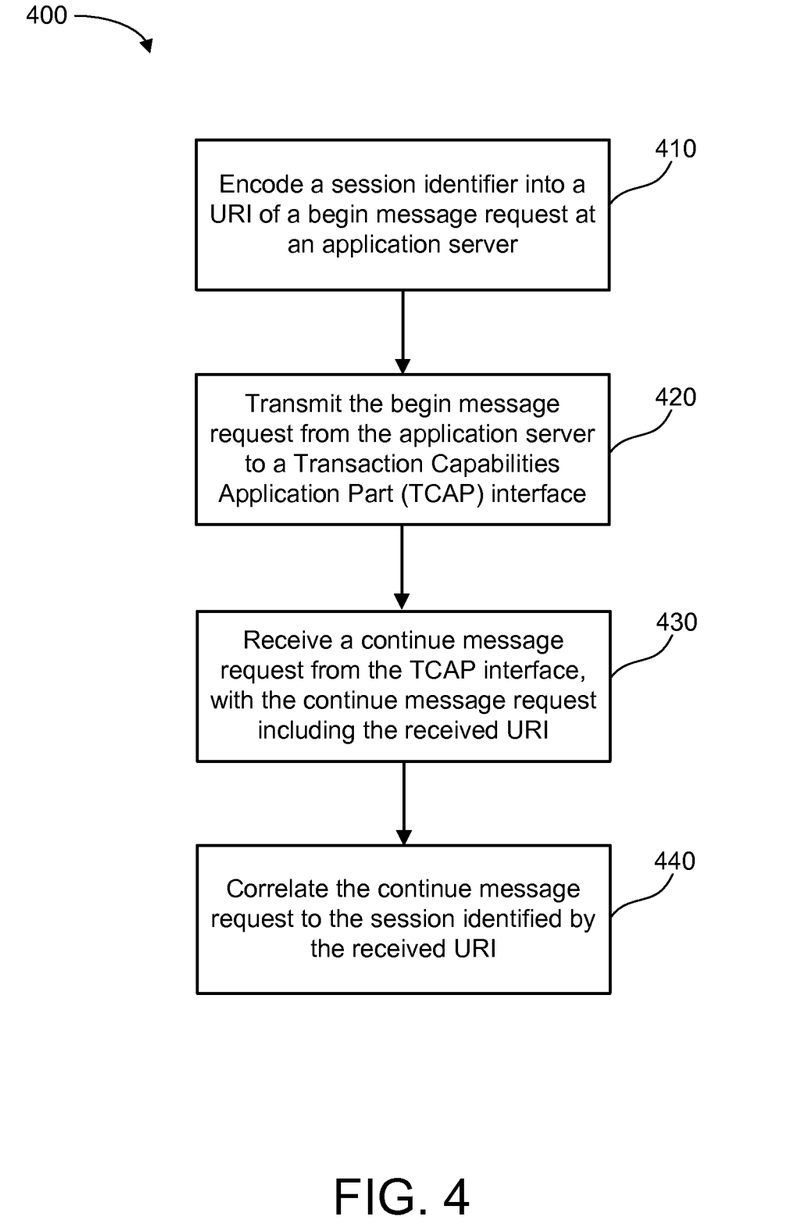
FIG. 4 depicts one embodiment of a process flow diagram for a web service method.

FIG. 4 depicts one embodiment of a process flow diagram for a web service method 400. The embodied method 400 includes encoding 410 a session identifier into a URI of a TCAP application. The encoded URI is then included into the TCAP Begin message request 270 originating at an application server 210. The encoded URI includes a session identifier that identifies an active session. The method 400 includes transmitting 420 the TCAP Begin message request 270 from the application server 210 to a TCAP interface 230 and receiving 430 a TCAP Continue message request 280 from the TCAP interface 230. The TCAP Continue message request 280 includes the encoded URI. The method 400 also includes correlating 440 the TCAP Continue message request 280 to the session identified by the session identifier in the received URI.

Embodied methods may also include assigning a received URI as an address of a web service endpoint and decoding the session identifier from the URI. The application server 210 may be any application server including WEBSPHERE™ application server, BEA WebLogic™, or the like.

The method may also include receiving an acknowledgment 275 sent from the TCAP interface 230 to the application server 210 in response to the TCAP Begin message request 270 from the application server 210. The acknowledgment response 275 may precede the TCAP Continue message request 280 sent from the TCAP interface 230 to the application server 210 so that call processing may continue without waiting for the TCAP Continue message request 280 response from the TCAP server (not shown).

Figure 5:
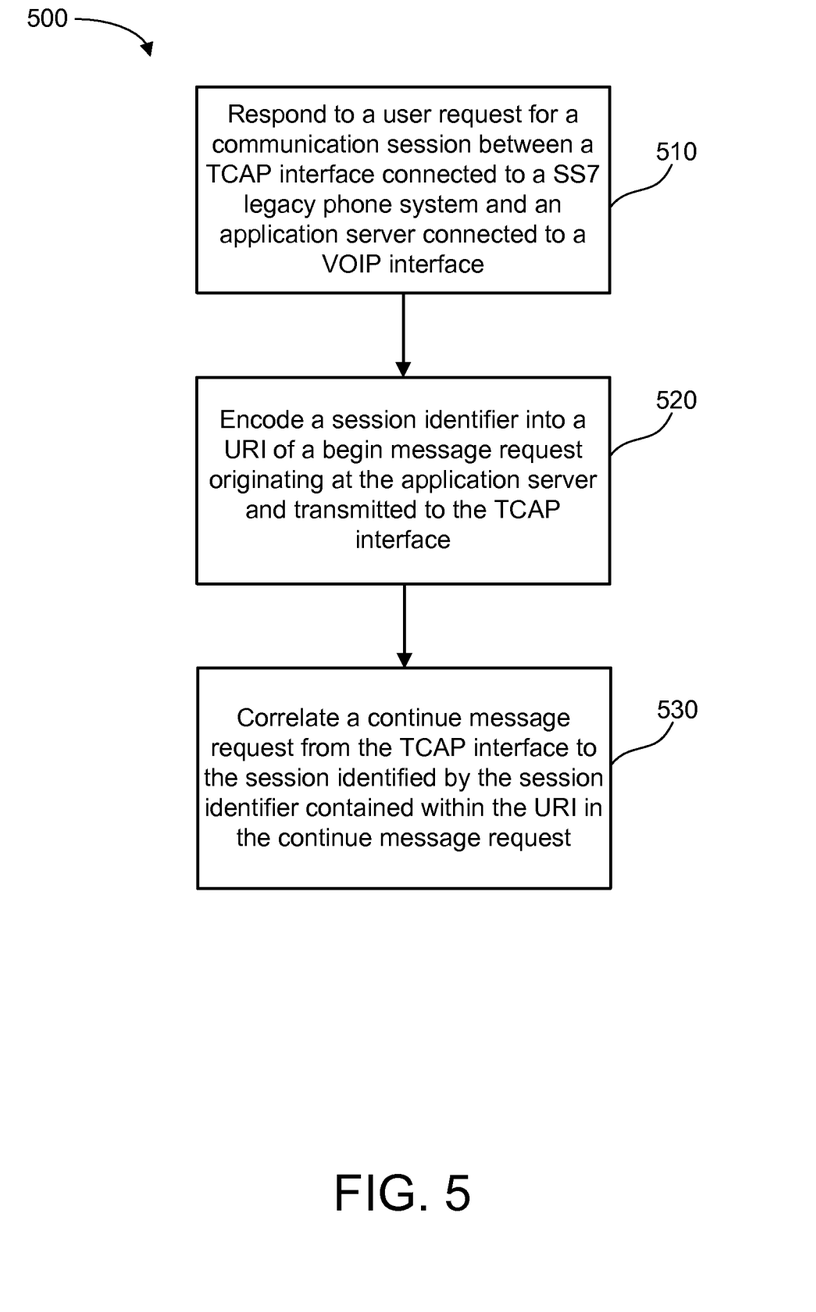
FIG. 5 depicts one embodiment of a process flow diagram for a method of use of an application server.

FIG. 5 depicts one embodiment of a process flow diagram for a method of use 500 of an application server. The embodied method 500 includes responding 510 to a user request for a communication session between a TCAP interface 230 connected to a SS7 legacy phone system 240 and an application server 210 connected to a VOIP interface 220. The embodied method 500 also includes encoding 520 a session identifier into a URI of a TCAP Begin message request 270 originating at the application server 210 and transmitted to the TCAP interface 230. The session identifier identifies a unique and active session in the application server 210. The embodied method 500 includes correlating 530 a TCAP Continue message request 280 from the TCAP interface 230 to the session identified by the session identifier in the URI included within the TCAP Continue message 280.

Some embodied methods of use of an application server to correlate a TCAP web service request to an application server session may also include a user communicating via the VOIP interface 220 for e-commerce applications. Such embodiments further include decoding the session identifier from the URI in the TCAP Continue message request 280 received from the TCAP interface 230. For example, a user may initiate a communication session by requesting validation of a PIN. The PIN entered by the user into a device connected to the VOIP interface 320 validates banking information on the user's banking account across phone lines. Also, an application server may initiate a communication session across legacy phone lines to create new customer business records, and update inventory levels in real time as well as other business maintenance and initiation transactions.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

An embodiment of a system to correlate a TCAP web service request to an application server session includes at least one application server 110 and a TCAP interface 130 coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A computer program product for a web service, the computer program product comprising a non-transitory computer useable storage medium to store a computer readable program, wherein the computer readable program, when executed on a computer, causes the computer to perform operations comprising:

encoding a session identifier into a uniform resource identifier (URI) associated with a Transaction Capabilities Application Part (TCAP) Begin message request originating at an application server within a telephone calling communication channel between a legacy telephone network and an internet protocol (IP) based telephone network, the session identifier to identify a communication session;

transmitting the TCAP Begin message request from the application server to a transaction capabilities application part (TCAP) interface;

receiving a TCAP Continue message request from the TCAP interface, the TCAP Continue message request comprising the URI; and correlating the TCAP Continue message request to the communication session that originated the request, identified by the session identifier encoded into the URI.

2. The computer program product of claim 1, wherein the computer readable program, when executed on the computer, causes the computer to perform an operation to route the TCAP Continue message request to the communication session.

3. The computer program product of claim 1, wherein the computer readable program, when executed on the computer, causes the computer to perform an operation to decode the session identifier from the URI.

4. The computer program product of claim 1, wherein the computer readable program, when executed on the computer, causes the computer to perform an operation to connect a Voice Over Internet Protocol (VOIP) interface to a Java Specification Request (JSR) 116 application server as the application server therein.

5. The computer program product of claim 1, wherein the computer readable program, when executed on the computer, causes the computer to perform an operation to connect the TCAP interface with a Signal System 7 (SS7) legacy phone system.

6. A method of a web service comprising:

encoding a session identifier into a uniform resource identifier (URI) associated with a Transaction Capabilities Application Part (TCAP) Begin message request originating at an application server within a telephone calling communication channel between a legacy telephone network and an internet protocol (IP) based telephone network, the session identifier to identify a communication session;

transmitting the TCAP Begin message request from the application server to a transaction capabilities application part (TCAP) interface;

receiving a TCAP Continue message request from the TCAP interface, the TCAP Continue message request comprising the URI;

correlating the TCAP Continue message request to the communication session identified by the session identifier; and routing the TCAP Continue message request to the communication session.

7. The method of claim 6, wherein correlating the TCAP Continue message request to the communication session identified by the session identifier further comprises decoding the session identifier from the URI.

8. The method of claim 6, wherein the application server is a Java Specification Request (JSR) 116 application.

9. The method of claim 8, further comprising connecting the JSR 116 application to a Voice Over Internet Protocol (VOIP) interface.

10. The method of claim 6, further comprising connecting the TCAP interface to a Signaling System 7 (SS7) legacy phone system.

11. A system of a web service comprising:

an encoder to encode a session identifier into a Uniform Resource Identifier (URI) associated with a Transaction Capabilities Application Part (TCAP) Begin message request at an application server within a telephone calling communication channel between a legacy telephone network and an internet protocol (IP) based telephone network, the session identifier to identify a communication session;

a transmitter to transmit the TCAP Begin message request from the application server to a transaction capabilities application part (TCAP) interface and a receiver to receive a TCAP Continue message request at the application server from the TCAP interface, the TCAP Continue message request comprising the URI;

a decoder to decode the session identifier from the URI; and a session manager to correlate the TCAP Continue message request to the communication session identified by the session identifier and route the TCAP Continue message request to the communication session.

12. The system of claim 11, wherein the session manager generates the session identifier and communicates the session identifier to the encoder for encoding into the URI of the TCAP Begin message request.

13. The system of claim 11, wherein the application server is a Java Specification Request (JSR) 116 application server.

14. The system of claim 13, further comprising a connection between the JSR 116 application server to a Voice Over Internet Protocol (VOIP) interface.

15. The system of claim 11, further comprising a connection between the TCAP interface and a Signal System 7 (SS7) legacy phone system.

16. A method of use of a legacy phone system via an application server, comprising:

responding to a request for a communication session between a Transaction Capabilities Application Part (TCAP) interface connected to a Signal System 7 (SS7) legacy phone system and an application server connected to a Voice Over Internet Protocol (VOIP) interface, by;

encoding a session identifier into a uniform resource identifier (URI) associated with a TCAP Begin message request originating at the application server and transmitted to the TCAP interface, the session identifier to identify a communication session;

correlating a TCAP Continue message request from the TCAP interface to the communication session identified by the session identifier; and routing the TCAP Continue message request to the communication session.

17. The method of use of a legacy phone system via an application server of claim 16, further comprising decoding the session identifier from the URI in the TCAP Continue message request received from the TCAP interface.

18. The method of use of a legacy phone system via an application server of claim 16, wherein the application server receives an input entered by a user into a device connected to the VOIP interface.

19. The method of use of a legacy phone system via an application server of claim 16, further comprising operating an e-commerce application across legacy phone lines to create new customer records, update inventory levels, and identify customer account status in real-time.

20. The method of use of a legacy phone system via an application server of claim 16, wherein correlating a TCAP Continue message request from the TCAP interface to the communication session identified by the session identifier enables a continuance in a mobile communication session with a user operating a device connected to the VOIP interface.

\* \* \* \* \*